United States Patent
Hust

(12) 
(10) Patent No.: US 10,402,844 B1
(45) Date of Patent: Sep. 3, 2019

(54) POST SALE REFERRAL TRACKING

(75) Inventor: Andrew Michael Hust, Littleton, CO (US)

(73) Assignee: CLICK SALES INC., Boise, ID (US)

( * ) Notice: Subject to any disclaimer, the term of this patent is extended or adjusted under 35 U.S.C. 154(b) by 1224 days.

(21) Appl. No.: 13/298,134

(22) Filed: Nov. 16, 2011

(51) Int. Cl.
| | |
|---|---|
| *G06Q 30/00* | (2012.01) |
| *G06Q 30/02* | (2012.01) |
| *G06Q 30/06* | (2012.01) |
| *G06Q 20/08* | (2012.01) |

(52) U.S. Cl.
CPC ..... *G06Q 30/0214* (2013.01); *G06Q 20/0855* (2013.01); *G06Q 30/02* (2013.01); *G06Q 30/0201* (2013.01); *G06Q 30/0203* (2013.01); *G06Q 30/0218* (2013.01); *G06Q 30/0242* (2013.01); *G06Q 30/0246* (2013.01); *G06Q 30/0247* (2013.01); *G06Q 30/0274* (2013.01); *G06Q 30/0601* (2013.01); *G06Q 30/0613* (2013.01); *G06Q 30/0633* (2013.01); *G06Q 30/0641* (2013.01); *Y10S 707/99945* (2013.01); *Y10S 707/99948* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
USPC ................................................ 705/7.11–7.42
See application file for complete search history.

(56) References Cited

U.S. PATENT DOCUMENTS

| | | | |
|---|---|---|---|
| 7,330,871 B2 | 2/2008 | Barber | |
| 7,337,133 B1* | 2/2008 | Bezos ................ | G06Q 20/0855 |
| | | | 705/14.41 |
| 8,145,526 B2* | 3/2012 | Redlich .................. | G06Q 30/02 |
| | | | 705/14.46 |
| 8,645,226 B1* | 2/2014 | Nguyen et al. ............ | 705/26.41 |
| 2012/0215612 A1* | 8/2012 | Ramer et al. ............... | 705/14.23 |
| 2012/0296783 A1* | 11/2012 | Barnett et al. ................... | 705/30 |

OTHER PUBLICATIONS

Francis Buttle. Customer Relationship Management, Elsevier Butterworth-Heinemann, 2004, 2008 (Year: 2008).*

* cited by examiner

*Primary Examiner* — Mehmet Yesildag
*Assistant Examiner* — Uche Byrd
(74) *Attorney, Agent, or Firm* — Fenwick & West LLP

(57) ABSTRACT

An e-commerce system is provided that tracks purchase transaction across multiple client devices. The e-commerce system stores hop information describing when a customer is exposed to a product of a vendor through an affiliate who advertises the vendor's products. The e-commerce system determines from the stored hop information which affiliate or affiliates to compensate for the sale of a product. This allows the e-commerce system to determine, after the sale, whether additional affiliates need to be compensated for the sale of the product based on the hop information.

21 Claims, 5 Drawing Sheets

US 10,402,844 B1

POST SALE REFERRAL TRACKING

BACKGROUND

The embodiments disclosed herein relate generally to electronic commerce (e-commerce), and more particularly to tracking e-commerce transactions across multiple client devices that are used to conduct the transactions and provide post sale affiliate referral tracking, affiliate fraud, affiliate attribution, client treatment, or customer quality metrics that are associated with the transactions, affiliates, or customers.

Conventional e-commerce systems facilitate purchase transactions between customers at client devices and vendors that are associated with the e-commerce systems. Conventional e-commerce systems also allow affiliates to advertise vendor products on their websites. These affiliates receive commission from vendors for products purchased by way of the affiliate's website.

Typically, e-commerce systems track affiliate referral to vendor products using cookies (i.e., a HTTP cookie) stored on client devices. The e-commerce systems store a cookie on a client device responsive to a customer using the client device to select a uniform resource locator (URL) link associated with a product that is advertised on an affiliate's web page. The URL link redirects the client device to a vendor's product page which allows the user to purchase the product. The limited size of cookies used by conventional e-commerce systems restricts the amount of information that can be stored in the cookies. Generally, these cookies comprise information about the vendor associated with the product and the affiliate that referred the user to the vendor's product.

When a customer purchases the product, conventional e-commerce systems can determine the affiliate that contributed to the sale of the product by accessing a cookie stored on the client device thereby allowing the affiliate to be compensated accordingly. This technique used by the e-commerce systems for affiliate compensation suffers from several deficiencies. For example, if a customer has disabled the use of cookies on his or her client device, the e-commerce systems cannot determine whether the sale of a product should be attributed to an affiliate because the systems lack the necessary cookie to determine an affiliate that referred the product to the customer that made the purchase transaction.

Furthermore, even if cookies are enabled, a customer may use multiple client devices to purchase a vendor product which can lead to incorrect attribution of the product sale. For example, a customer may use a first client device to visit a product page of a vendor through advertising on an affiliate's website. Accordingly, a cookie is stored on the first client device indicating the vendor associated with the product and the affiliate that referred the product to the customer. However, the customer may not complete the purchase of the product using the first client device. Rather, at a later time the customer may use a second client device to directly access the product page and complete the purchase of the product. Thus, although an affiliate contributed to the purchase transaction, the affiliate is not credited for the transaction because the second client device lacks affiliate information in a cookie stored at the second client device.

SUMMARY

Embodiments described herein provide techniques for implementation in an e-commerce system by an online marketplace server to detect the use of multiple client devices by a single customer when making purchase transactions with vendors. In one embodiment, the marketplace server comprises an account database that stores customer activity information for customers that complete purchase transactions with vendors that are facilitated by the marketplace server. The customer activity information for a customer may include data records indicative of affiliates that referred the customer to vendor products, client devices associated with the customer, and purchase transaction (orders) information associated with the customer.

When a customer's client device is referred to a vendor's website via advertising on an affiliate's website, the customer activity information for the customer is updated. By storing the customer activity information at the marketplace server rather than on a cookie at the customer's client device, the marketplace server can accurately monitor or track the affiliates involved in transactions with vendors even if those transactions occurred using multiple client devices that are associated with the customer. This allows for affiliates to be properly compensated for their referrals' to vendor products. Furthermore, because the customer activity information is stored at the marketplace server rather than at the customer's client device, the marketplace server need only store a cookie at the client device of the customer comprising a unique device identifier of the device. The unique device identifier may be used to access the customer activity information in the account database.

Additionally, the marketplace server allows affiliates to be properly compensated for their product referrals even if cookies are not stored on client devices of customers. If a client device that completed a purchase transaction through the marketplace server lacks a cookie, the marketplace server is not initially aware of the identity of the client device and may not be able to attribute the transaction to an affiliate. However, the marketplace server may utilize the customer activity information post sale (i.e., after the transaction) to determine the customer or client device associated with the completed purchase transaction. Because the marketplace server stores transaction information, the marketplace server may identify which client device is associated with the completed transaction and review the customer activity information to identify instances when one or more affiliates referred the purchased product to the customer when using the client device. The marketplace server may also analyze data records of the customer's other client devices to determine whether there is an indication that another affiliate(s) referred the purchased product to the customer when the customer was using his or her other client devices. Once the affiliate(s) that contributed to the transaction are identified from the customer activity information, credit for the transaction is attributed to the affiliate(s) post sale.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
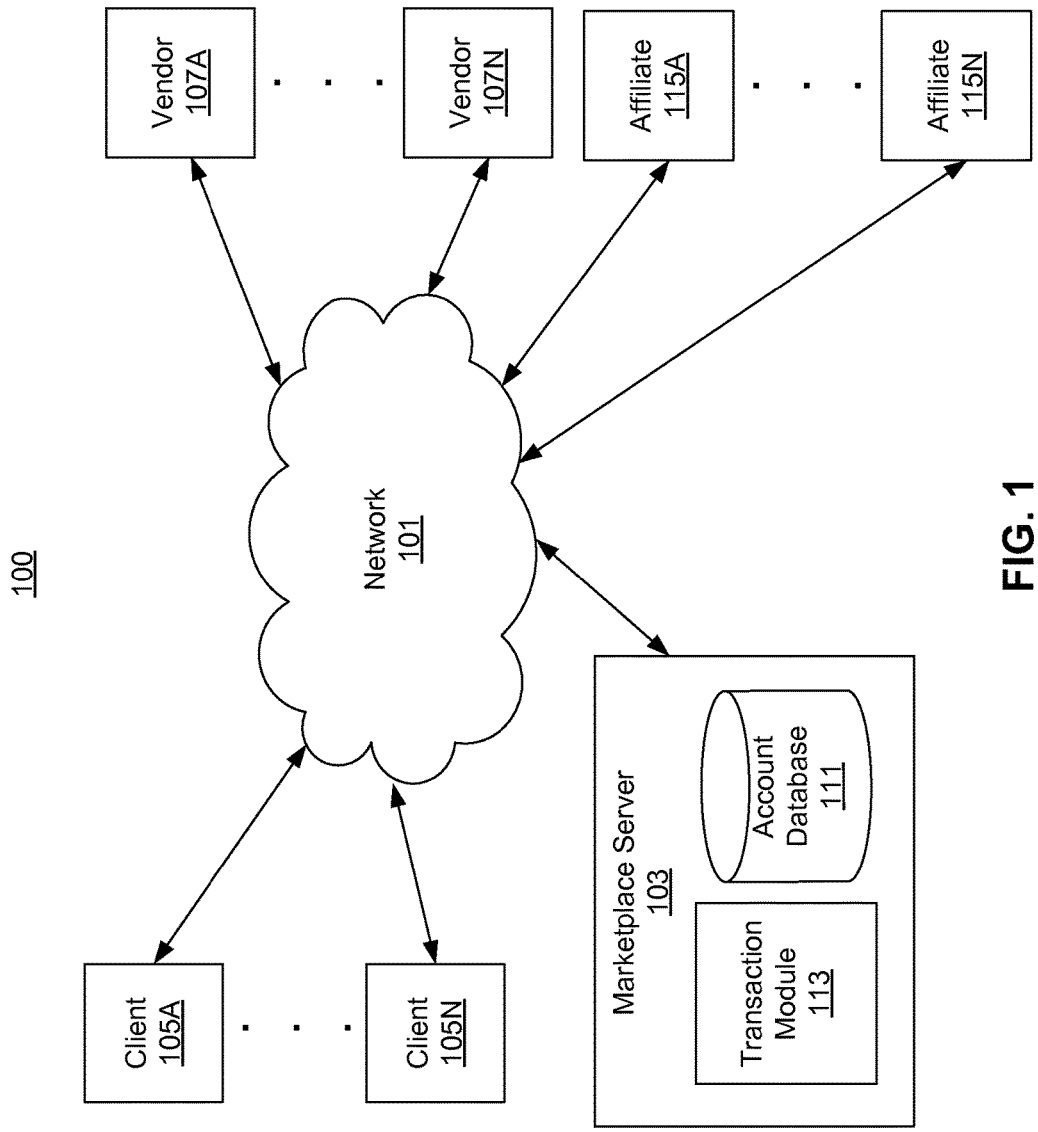
FIG. 1 illustrates a computing environment of an e-commerce system in accordance with one embodiment.

FIG. 1 illustrates an exemplary e-commerce environment 100. One or more customers at client devices 105A through 105N are in communication with a marketplace server 103, one or more vendors 107A through 107N, and one or more affiliates 115A through 115N via a network 101. Embodiments of the computer environment 100 may have thousands or millions of client devices 105, vendors 107, and affiliates 115 connected to the marketplace server 103 via the network 101.

The client device 105, for example, may be a personal computer comprising a web browser, which allows the customer to communicate with the marketplace server 103 and vendors 107. In other embodiments, the client 105 is a network-capable device other than a computer, such as a personal digital assistant (PDA), a mobile telephone, a tablet computer, a television "set-top box," etc. The network 101 enables communications between the marketplace server 103, vendors 107 and client devices 105. In one embodiment, the network 101 uses standard communications technologies and/or protocols. Depending upon the embodiment, the network 101 may include links to or comprise other networks, such as the Internet.

In one embodiment, vendors 107 are entities that sell products to customers. The products may include digital products such as electronic books (e-books), downloadable software, and/or online services. Alternatively, the products may include any type of product or service for which a transaction may be made online, including financial products and services or subscriptions or shippable products. Vendors 107 work in conjunction with the marketplace server 103 and with affiliates to sell products to customers. Each product sold by a vendor 107 has an associated pitch (product) page that describes the product and a download URL if the product is a digital product. In one embodiment, each pitch page is associated with a pitch page URL that links to the pitch page. Typically, the pitch page URL is displayed on the marketplace server, in an affiliate's website, and/or a vendor's website for advertisement purposes.

In one embodiment, an affiliate of the marketplace server 103 may advertise a vendor's products on his or her website. An affiliate 115 is a person or entity that receives commission from vendors 107 or the marketplace server 103 for completed transactions that occur as a result of the affiliate referring the product to customers on the affiliate's website. In one embodiment, a referrer link is displayed on an affiliate's website. A referrer link is a web address that directs customers who click on the link to a vendor's website according to one embodiment.

Each product is also associated with a download URL. As described previously, products provided by vendors 107 are typically digital products. After a customer purchases a product, the marketplace server 103 provides a link to the vendor's web site which includes a download URL so that the customer may download the purchased product.

Generally, the marketplace server 103 facilitates purchase transactions between customers at client devices 105 and vendors 107 and directs customers to pitch pages of products provided by vendors 107. In alternative embodiments, the marketplace server 103 may also be considered a vendor 107 and provide the functionality of a vendor 107 as described herein. That is, the marketplace server 103 may provide its own products for purchase by customers thereby functioning as a vendor 107. A suitable website provided by the marketplace server 103 is found at www.clickbank.com. Additionally, the marketplace server 103 advertises products sold by vendors 107 on the website provided by the marketplace server 103.

As illustrated in FIG. 1, the marketplace server 103 comprises various modules including a transaction module 113 and an account database 111. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by a computer processor. Additionally, those of skill in the art will recognize that other embodiments of the marketplace server 103 shown in FIG. 1 can have different and/or other modules than the ones described here, and that the functionalities can be distributed among the modules in a different manner.

Figure 2:
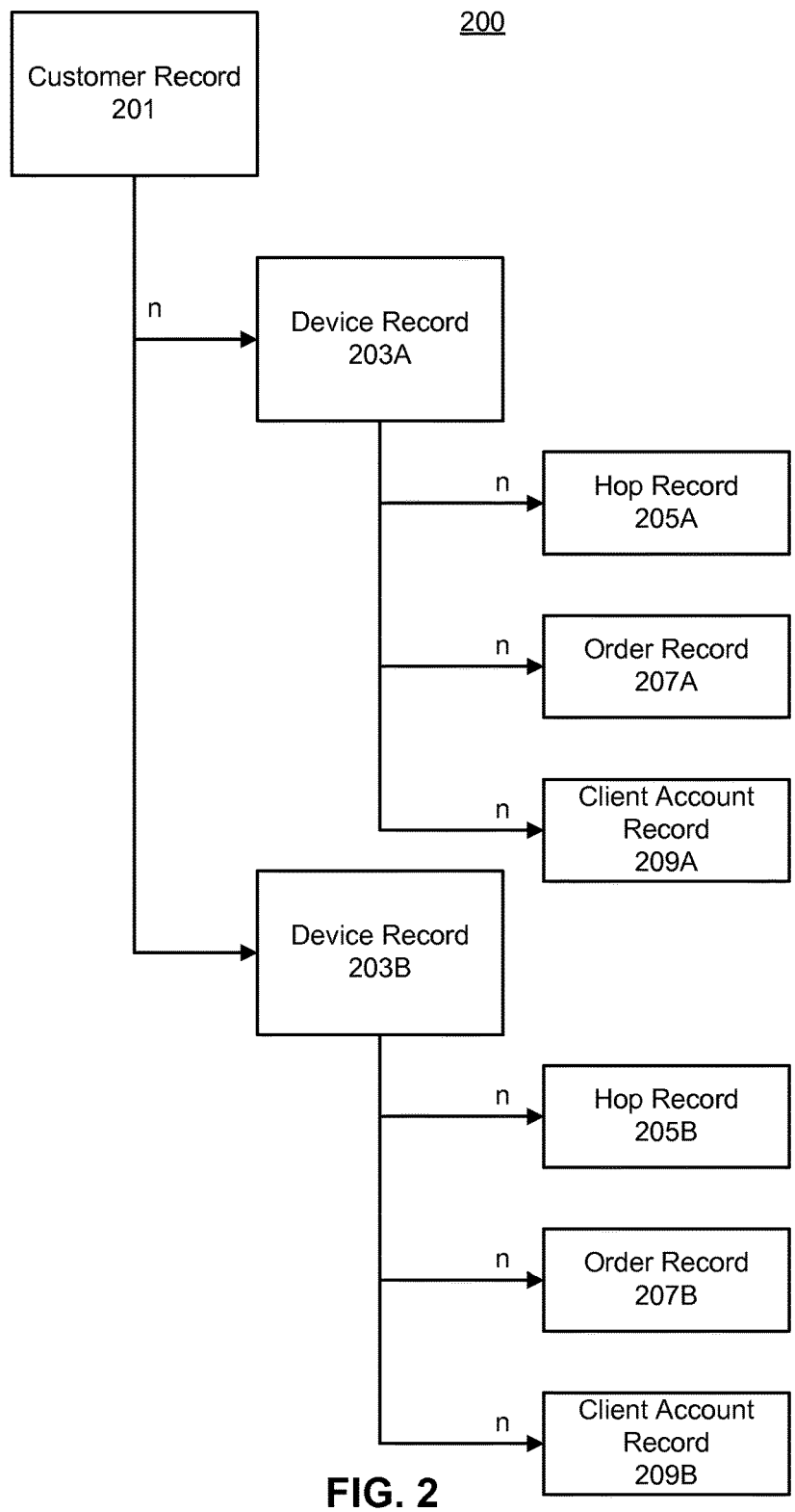
FIG. 2 illustrates a data record tree of customer activity in accordance with one embodiment.

In one embodiment, the account database 111 stores customer activity information for customers of the marketplace server 103. The account database 111 may also store account information for affiliates 115 and vendors 107 associated with the account database 111. FIG. 2 illustrates a data record tree 200 for a customer 201 that is representative of customer activity information for the customer 201. The data record tree 200 illustrates an association of the customer's various devices, hop records, order information, and optionally the client account records if the customer is an affiliate or vendor as will be further described below.

As shown in FIG. 2, the data record tree 200 comprises a customer record 201. Customers are represented in the marketplace server 103 by their associated customer record 201. In one embodiment, each customer record 201 comprises a unique customer identifier (ID) that is associated with the customer. The customer record 201 may also store contact information for the customer such as the user's name, electronic mail (e-mail) address(es), residence address, business address, and telephone number. The customer record 201 may also store financial information for the customer such as credit card information, bank account information, and/or a payer ID (e.g., a PayPal™ ID).

For each customer record 201, the account database 111 stores a set of n devices records 203 that are associated with the customer record 201. The set of n device records 203 represents the known client devices that are used by the customer when interacting with the marketplace server 103. In the example illustrated in FIG. 2, customer record 201 is associated with two device records: device record 203A and device record 203B. Each device record 203 comprises a unique device ID that is associated with a client device 105. The device ID for a given client device 105 may be included in a cookie that is stored on the device. The device ID is used by the marketplace server 103 to identify the data record tree 200 associated with the customer that is purchasing a product or viewing a pitch page of a product through an affiliate's website.

Furthermore, each device record 203 comprises one or more fingerprints that represent the client device 105 associated with the device record 203. A fingerprint for a client device 105 may be used to identify the client device 105 if the client device 105 lacks a cookie with a device ID. In one embodiment, a device record 203 comprises a first level fingerprint. The first level fingerprint is a hash of information sent to the marketplace server 103 from a web browser (e.g., MOZILLA FIREFOX, GOOGLE CHROME, MICROSOFT INTERNET EXPLORER, etc.) on the client device 105. The marketplace server 103 may assemble an attribute string formed by various attributes or configuration settings of the browser as described in U.S. Pat. No. 7,330,871 filed Jun. 5, 2001, which is incorporated by reference in its entirety. For example, the browser may send user agent information associated with the web browser comprising a string that identifies the user agent (e.g., a version of the browser). The web browser may also send the internet protocol (IP) address associated with the client device 105 when communicating with the marketplace server 103. The marketplace server 103 may apply a hash function (i.e., a hash digest) such as MD5, SHA1, etc. to the information received from the web browser. The values returned from the hash function represent a first level fingerprint for the client device 105 and are stored in the device record 203.

Each device record 203 may also comprises a second level fingerprint. The second level fingerprint is based on device information that the marketplace server 103 requests from the client device 105 associated with the device record 203. The marketplace server 203 may store a script which requests device information from the device 203 that is used to create the second level fingerprint. For example, the script may request information describing the device model number, serial number associated with the device, an address associated with the customer that registered the device, the IP address associated with the device, installed fonts, installed plug-ins (including the versions of the plug-ins), screen resolution, user agent information, operating system information, and http headers, or any other information that can be used to represent the device. A hash function as described above may be applied to the information received in response to the request to generate the second level fingerprint. The resulting values returned from the hash function represent the second level fingerprint from the client device 105 and are stored in the device record 203.

In one embodiment, the data tree record 200 for a customer comprises a set of n hop records 205 that are associated with each device record 203. The set of n hop records 205 for a device record 203 describe the interaction between the client device 105 represented by the device record 203 and affiliates of the marketplace server 103. As shown in FIG. 2, device record 203A is associated with n hop records 205A and device record 203B is associated with n hop records 205B.

In one embodiment, a hop record describes an associated client device's exposure to an affiliate referral link (i.e., a specific affiliate) otherwise known as a "hop." For example, when a customer at a client device 105 selects a redirect on an affiliate's website that directs the customer to a vendor's website, the customer redirection to the vendor's website is considered a "hop." That is, a hop record describes an affiliate that referred the client device 105 to a product of a vendor using the client device 105 associated with the hop record.

In one embodiment, a hop record 205 comprises one or more of the following hop attributes:
  a unique customer ID associated with the customer;
  a unique device ID of the client device 105 that was involved in the hop described by the hop record 205;
  an affiliate ID of the affiliate 115 that directed the customer 201 to a vendor's pitch page during the hop;
  a vendor ID of the vendor 107 associated with the pitch page that was displayed to the customer during the hop;
  a URL of the pitch page associated with the hop;
  user agent (e.g., a browser) information on the client device 105 in communication with the marketplace server 103 during the hop;
  a tracking indication from the client device 105 indicative of whether tracking the customer's interaction with the marketplace server 103 is allowed;
  a vendor category associated with the vendor 107 that describes the type of products sold by the vendor such as "Health & Fitness"; and
  a product category associated with the pitch page to which the customer was redirected to during the hop that describes the type of product advertised in the pitch page such as "e-books."

As shown in FIG. 2, the data record tree 200 for the customer also comprises a set of n order records 207 that is associated with each device record 203. The set of n order records 207 for a device record 203 represents the complete list of purchase transactions of the customer that were completed using the client device 105 represented by the device record 203. In one embodiment, an order record describes a particular purchase transaction with a vendor 107 through the marketplace server 103 using the client device 105 represented by the device record 203. In one embodiment, an order record comprises one or more of the following order attributes:
  an order ID associated with the order record that represents the particular purchase transaction;
  a product ID associated with the product that was purchased in the purchase transaction;
  a timestamp that describes the time when the purchase transaction was completed;
  the name of the customer associated with the purchase transaction;
  an address of the customer associated with the purchase transaction;
  an e-mail address of the customer associated with the purchase transaction; and
  payment information used to pay for the product associated with the order record 207 such as the credit card number, credit card expiration date, and name on the credit card.

In one embodiment, if the customer record 201 is representative of a vendor 107 or an affiliate 115 that purchases products through the marketplace server 103, a device record 203 is associated with a set of n client account records 209. A client account record 209 describes vendor or affiliate account information with the marketplace server 103. The account information may comprise an account ID for the vendor 107 or affiliate 115, completed purchases associated with the account, one or more user names associated with the client account, authentication credentials for the vendor/affiliate to log into the account, and/or the last login time to the client account. Storing client account records 209 for vendors and affiliates allows the marketplace server 103 to identify suspicious behavior such as fraud or cookie stuffing. For example, the client account record 209 may used to determine that an affiliate 115 is referring itself when making purchases in order to reduce the price of the purchase. By tracking client logins to the marketplace server 103, the marketplace server 103 may also reject refunds submitted by vendors/affiliates that purchase and attempt to refund competitor products or may apply different refund rules to the refund requests. Abusers of a refund policy associated with the marketplace server 103 (e.g., purchasing several products with high refund rates) may be detected at order time and prevent the purchase of products. Similarly, the marketplace server 103 may provide post sale affiliate referral tracking, affiliate fraud, affiliate attribution, special client treatment, or customer quality metrics that are associated with transactions, affiliates, or customers.

Referring back to FIG. 1, the marketplace server 103 comprises a transaction module 113. Generally, the transaction module 113 facilitates transactions between customers on client devices 105 and vendors 107. More particularly, the transaction module 113 tracks a customer's purchase transactions across a plurality of client devices 105 and updates the customer's activity information in the account database 111. The transaction module 113 also updates the customer's activity information when the customer is exposed to affiliates of the marketplace server 103. The transaction module 113 utilizes the activity information of a customer stored in the account database 111 to unify the information across multiple client devices.

For example, when a cookie is not stored in a client device 105 or the cookie lacks the unique device ID of the client device 105, the transaction module 113 uses the customer activity information stored in the account database 111 to determine the customer ID of the customer thereby exposing which affiliate(s) should be compensated for the purchase order. Thus, the transaction module 113 can identify one or more affiliates that are associated with a purchase order even when multiple client devices 105 are used by the customer to complete the transaction or if cookies are not enabled (or unavailable) on the client device 105.

Multiple Device Tracking

Figure 3:
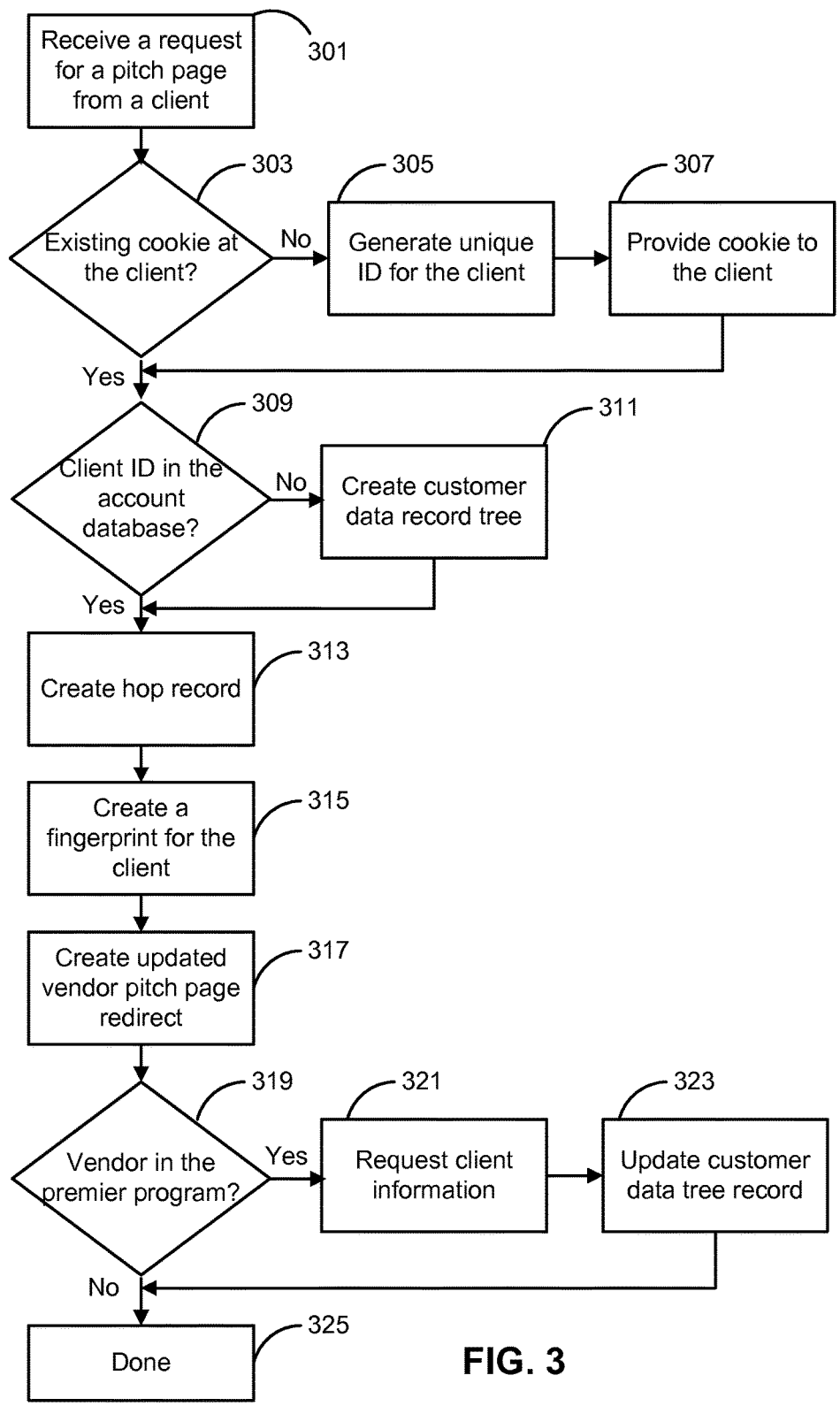
FIG. 3 illustrates a method flow diagram for updating customer activity information with affiliate referrals in accordance with one embodiment.

Referring now to FIG. 3, one embodiment of a method performed by the transaction module 113 to update a customer's activity information in the account database 111 is shown when a customer interacts with affiliates. Note that other embodiments perform the illustrated steps in different orders, and/or perform different or additional steps.

In one embodiment, the transaction module 113 receives 301 a request for a pitch page from a customer's client device 105. For example, the transaction module 113 may receive an indication that the customer selected a link on an affiliate's website that redirected the client device 105 to a vendor's pitch page. The transaction module 113 determines 303 whether there is an existing cookie stored at the client device 105. The transaction module 113 may communicate with the client device 105 requesting that the client device 105 provide the unique device ID stored in the cookie if available. If the client device 105 lacks a cookie comprising the device ID of the client device 105, the transaction module 113 generates 305 a unique device ID for the client device 105. The transaction module 113 provides 307 a cookie comprising the unique device ID to the client device 105 for storage.

Responsive to providing the cookie 307 to the client device 105 or responsive to determining 303 that there is an existing cookie at the client device 105 that comprises the device ID of the device 105, the transaction module 113 determines 309 whether the device ID (i.e., the recently created device ID or the device ID included in the existing cookie) is included in the account database 111. If the device ID is not in the account database 111, the transaction module 113 creates a data record tree for the customer as described with respect to FIG. 2.

Responsive to creating 311 the data record tree or responsive to determining 309 that the device ID is included in the account database 111, the transaction module 113 creates 313 a hop record and associates the hop record with the customer's data tree record. The created hop record includes the hop attributes of the affiliate 115 that referred the customer to the requested pitch page. By creating the hop record, the affiliate information associated with the hop record can be accessed by the transaction module 113 to determine the affiliate 115 that referred the product even if the product is not purchased until a later time. Thus, if the customer uses another client device 105 to purchase the product at a later time without the customer accessing the pitch page for the product via the affiliate's website, the affiliate's referral of the product is still tracked since it is stored in the hop record. Thus, by updating the data record tree for a customer when the customer interacts with an affiliate 115, the resulting hop record ensures that the affiliate 115 will be properly compensated for referring the product to the customer.

In one embodiment, the transaction module 113 also creates 317 a fingerprint for the client device 105 and stores the fingerprint in the customer's data record tree. The fingerprint may be a first level fingerprint. The fingerprint may be used to identify the client device 105 at a later time if the cookie is no longer stored at the client device 105.

The transaction module 113 creates 317 an updated pitch page redirect and communicates the redirect to the web browser on the client device 105. The redirect causes the client device 105 to load the vendor's pitch page for the product of interest. In one embodiment, the updated pitch page redirect comprises the device ID associated with the client device 105. By having the device ID in the redirect, the transaction module 113 may identify and update the proper data record tree for the customer based on the device ID if the customer purchases the product.

In one embodiment, the transaction module 317 determines 319 whether the vendor is in a premier vendor program of the marketplace server 103. In one embodiment, the vendor pays the marketplace server 103 to be classified as a premier vendor. A vendor may also be promoted to the premier status after selling a threshold number of products via the marketplace server 103. By being in the premier vendor program, the marketplace server 103 returns the premier vendor's pitch pages as the top search results in response to search queries for products provided by the premier vendor.

If the vendor is in the premier vendor program, the transaction module 113 requests 321 client device information from the client device 105 that can be used to generate a second level fingerprint. Thus, by being in the premier vendor program, the transaction module 317 asserts more effort in obtaining information about the vendor's customers. Responsive to receiving the client device information, the transaction module 113 generates the second level fingerprint based on the client device information and updates 323 the customer's data tree record with the second level fingerprint. If the vendor is not in the premier program, the transaction module 317 is done updating the data record tree for the customer. The method illustrated in FIG. 3 is repeated when a customer is referred to a pitch page by an affiliate 115 to ensure the data record tree for the customer is kept up to date.

Post Sale Affiliate Compensation

Referring back to FIG. 1, in one embodiment the transaction module 113 also determines post sale affiliate compensation. That is, after a purchase transaction has been completed, the transaction module 113 analyzes the customer activity information stored in the account database 111 to identify an affiliate(s) that referred a vendor's product to a customer that purchased the product. For example, the transaction module 113 may analyze the customer activity information stored in the account database 111 to determine that the affiliate 115 that was initially credited for the product order was not the most deserving affiliate 115. In one embodiment, the most deserving affiliate 115 may be considered the affiliate 115 that initially advertised the purchased product to the customer if multiple affiliates referred the purchased product to the customer. Alternatively, the most deserving affiliate is considered the affiliate that referred the product at the time of purchase if multiple affiliates referred the purchased product to the customer. Furthermore, if no affiliate 115 was initially credited for a referral of a product purchased by a customer because of the absence of a cookie on the client device 105 of the customer, the transaction module 113 may identify from the customer activity information in the account database 111 an affiliate 115 that referred the purchased product on another client device that is different from the client device that completed the order.

Figure 4A:
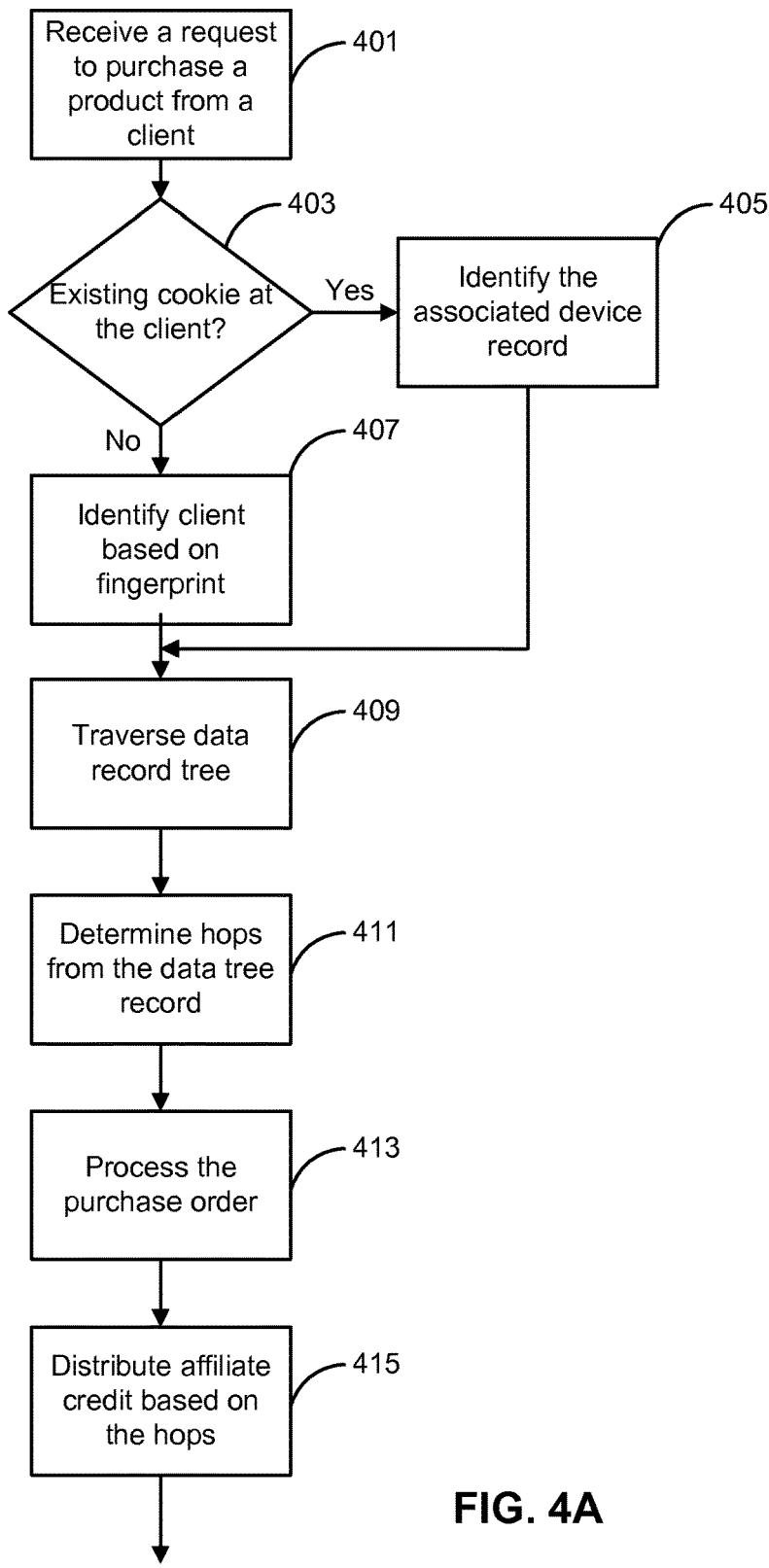
FIG. 4A and FIG. 4B illustrate a method flow diagram for determining post sale affiliate credit in accordance with one embodiment.

Referring now to FIG. 4A, one embodiment of a method performed by the transaction module 113 to complete a purchase transaction is illustrated. Note that other embodiments perform the illustrated steps in different orders, and/or perform different or additional steps.

As shown in FIG. 4A, the transaction module 113 receives 401 a request to purchase a product from a customer's client device 105. In one embodiment, the request is received by a way of an affiliate's website that referred to the product to the customer. The transaction module 113 communicates with the client device 105 to determine 403 whether a cookie exists at the client device 105. If a cookie exists at the client device 105, the transaction module 113 identifies 405 the associated device record for the client device 105 based on the device ID included in the cookie.

If the transaction module 113 determines 403 that the client device 105 lacks a cookie, the transaction module 113 identifies 407 the client device 105 based on fingerprints associated with the client device 105. In one embodiment, the transaction module 113 generates a first level fingerprint based on client data received from the browser of the client device 105 and compares the first level fingerprint with first level fingerprints in the account database 111 to identify a matching first level fingerprint. If the transaction module 113 identifies a match, the transaction module 113 determines the device ID associated with the matching first level fingerprint. In one embodiment, if the transaction module 113 cannot identify the device ID based on the first level fingerprint for the client device 105, the transaction module 113 requests client data from the client device 105 to generate a second level fingerprint. Based on the second level fingerprint, the transaction module 113 identifies a device ID in the account database 111 with a matching second level fingerprint.

After the transaction module 113 has identified the device ID for the client device 105 based on either the fingerprints or the cookie, the transaction module 113 traverses 409 the data record tree corresponding to the device ID to identify the set of n hop records associated with the device ID. Because the device ID corresponds to a device record that is associated with other device records for the customer, the transaction module 113 can identify the set of n hop records across all of the other device records for the customer.

The transaction module 113 determines 411 from the set of n hop records across the customer's client devices, one or more hop records that are associated with the product requested by the client device 105. The transaction module 113 may identify the hop records associated with the product based on the hop attributes for the hop records. Particularly, the transaction module 113 identifies one or more hop records that comprise a URL of the pitch page associated with the requested product. The inclusion of the URL of the pitch page of the requested product in a hop record indicates that the customer viewed the pitch page for the product through the website of an affiliate 115 indicated in the hop record. Thus, the transaction module 113 identifies a referring affiliate for compensation purposes for the referral.

The transaction module 113 then processes 413 the purchase order for the product. That is, the transaction module 113 may receive the payment information of the customer from the client device 105 and completes the purchase order using the payment information. Alternatively, the transaction module 113 identifies the payment information for the customer based on payment information stored in the account database 111 rather than receive the payment information from the customer at the time of purchase. The transaction module 113 then distributes 415 affiliate credit based on the identified hops that are associated with the product order. The transaction module 113 may distribute credit to one or more affiliates based on the number of affiliates indicated in the identified hops related to the purchase transaction. In other words, the transaction module 113 determines how credit is attributed to affiliates when multiple affiliates are involved in the referral of a product.

The transaction module 113 determines the amount of credit attributed to an affiliate 115 from among a plurality of affiliates that contributed to a customer's purchase of a product based on various factors. Particularly, the transaction module 113 measures the contribution of each affiliate that influenced the purchase transaction. A customer's product interactions that influenced the customer to purchase a product may be a result of advertisements displayed on an affiliate's website (e.g., pay per click advertisements or advertisement impressions), e-mail campaigns developed by the affiliate, special offers offered the affiliate, and/or organic search queries through the affiliate's website resulting in the identification of the product.

The affiliate with the greatest influence may receive the greatest attribution. In one embodiment, the amount of credit that an affiliate receives is based on the number of times the affiliate referred a purchased product to a customer and the total number of times that the product was referred to the customer. For example, the hop records in the account database 111 may indicate that a first affiliate and a second affiliate both influenced a customer to purchase a product. The transaction module 113 may identify that the product was referred to the customer a total of 5 times with the first affiliate contributing 4 of the referrals and the second affiliate contributing only 1 of the referrals. The transaction module 113 may determine that the first affiliate contributed 80% to the customer's decision to purchase the product and the second affiliate contributed 20% to the customer's decision to purchase the product based on the total number of referrals and the number of times each affiliate referred the product. The transaction module 113 accordingly awards the commission to the first affiliate and the second affiliate based on the percentage of contribution to the sale of the product.

Alternatively, the affiliate 115 that first referred the customer to the product may receive the largest compensation compared to the compensation received by the other affiliates. The affiliate that first referred the customer to the product is compensated the most regardless of the number of times the affiliate referred the product because that affiliate initiated the customer's interest in the purchased product. Alternatively, the last affiliate that referred the product prior the customer purchasing the product may receive the largest compensation compared to the compensation received by the other affiliates because the last affiliate's referral led to the completion of the transaction.

In another embodiment, the affiliate that first referred the customer to the product and the last affiliate that referred the product prior to the customer purchasing the product are the only affiliates that receive compensation. In another embodiment, if more than two affiliates referred the product, the other affiliates that referred the product to the customer between the exposure of the product by a first affiliate and the exposure of the product by a last affiliate prior to the customer purchasing the product also receive compensation, albeit a smaller compensation than the first affiliate and the second affiliate. Alternatively, compensation may be equally distributed to the affiliates that referred the product to a customer.

In one embodiment, the credit that an affiliate receives as a result of a sale of a product through the affiliate's website is designated by the vendor 107 of the purchased product. In one embodiment, the total commission may be a flat fee or may be a percentage of the purchase price of the product. Thus, the total compensation may be distributed to the affiliates based on various schemes described above. Other compensation schemes may be used than those described herein.

Figure 4B:
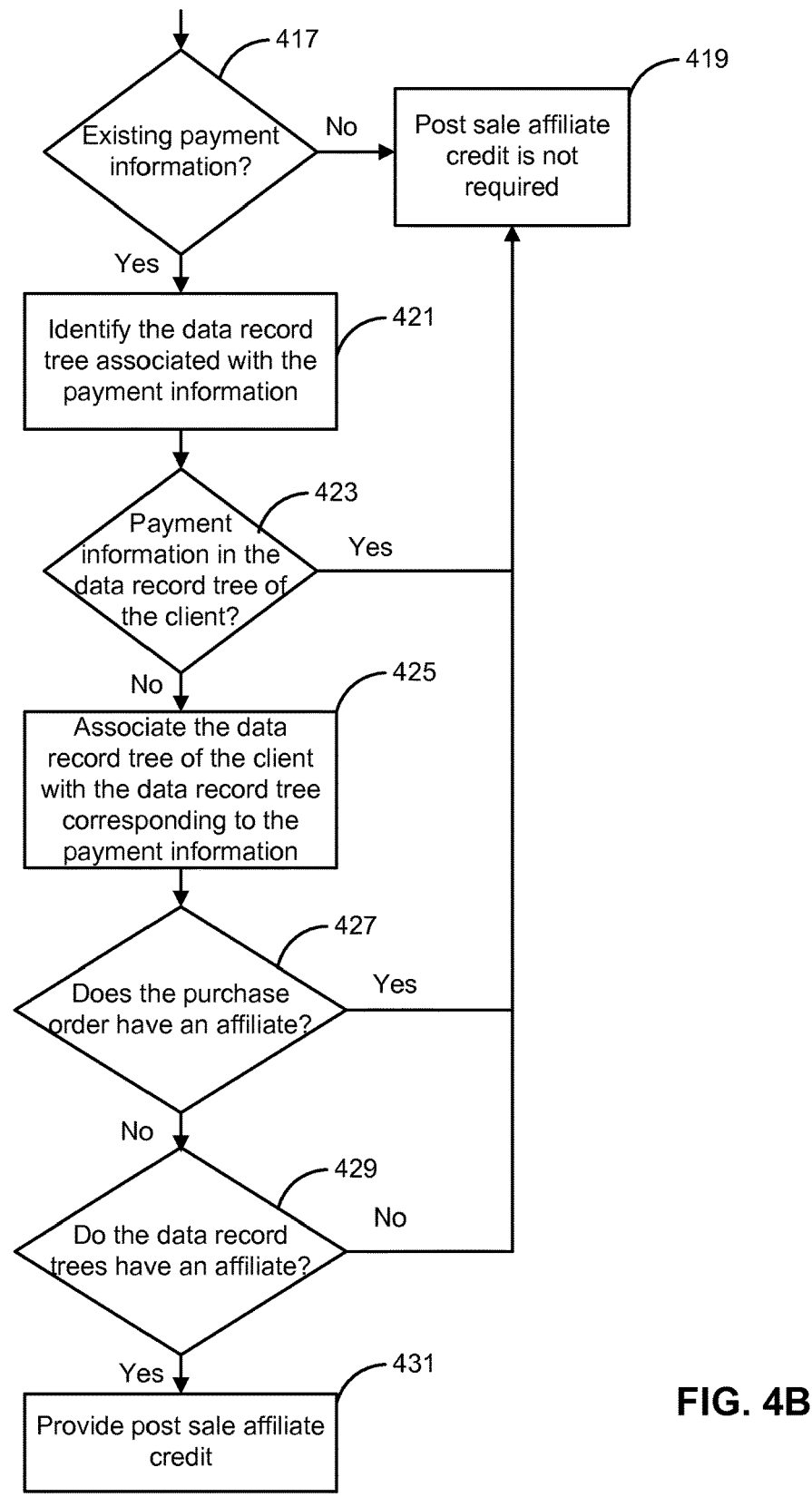

Referring now to FIG. 4B, one embodiment of a method performed by the transaction module 113 to identify post sale affiliate credit is shown. Note that other embodiments perform the illustrated steps in different orders, and/or perform different or additional steps. Note that steps illustrated in FIG. 4B are a continuation of the method performed in FIG. 4A in one embodiment.

After distributing affiliate credit based on the identified hops, the transaction module 113 determines 417 whether the payment information used to complete the purchase transaction is already stored in the account database 111. The account database 111 lacking the payment information used by the customer to conduct the transaction is indicative of the customer not being referred by an affiliate which causes the transaction module 113 to determine 419 that post sale affiliate credit is not required.

If the payment information is included in the account database 111, the transaction module 111 identifies 421 the data record tree associated with the payment information. The transaction module 111 determines 423 whether the data record tree associated with the payment information is the same data record tree associated with the client device 105 used to complete the product order. If the data record tree associated with the payment information is the same data record tree associated with the client device 105, the transaction module 113 determines 419 that post sale affiliate credit is not required because the traversal of the data record tree in step 409 would have already revealed the affiliates that contributed to the sale of the purchased product.

If the data record tree associated with the payment information is not the same data record tree associated with the client device 105, the transaction module 113 associates the data record tree of the client device 105 with the data record tree associated with the payment information. Thus, although the device ID associated with the payment information is different from the device ID of the client device 105 used to make the purchase, having the same payment information span across multiple data record trees because of the association can be used in the future as an indication that the trees are associated with the same customer. By associating the data record trees to one another, the transaction module 113 may utilize customer activity information from both data record trees when receiving request for products from the various device IDs in the data record trees.

The transaction module 113 then determines 427 whether the purchase order was associated with an affiliate(s). If an affiliate was already associated with the purchase order, the transaction module 114 determines 419 that post sale affiliate credit is not required. If the purchase order did not have an associated affiliate, the transaction module 113 determines whether the newly associated data record trees 429 are indicative of one or more affiliates that referred the product that was purchased by the customer. In one embodiment, the transaction module 113 traverses the hop records in the associated data record trees to determine affiliates associated with the referral of the purchased product as previously described with respect to FIG. 4A. If the transaction module 113 determines that the associated data record trees do not have any additional affiliates other than those already determined from step 411, the transaction module 411 determines 419 that post sale affiliate credit is not required. However, if the transaction module 113 determines that the associated data record trees comprise additional affiliates than those determined from step 411, the transaction module 431 provides post sale affiliate credit to the additional affiliates. Thus, the transaction module 113 has identified affiliates that should be credited for referring the purchased product after the completion of the purchase transaction using the customer activity information stored in the account database 111.

Customer Quality Score

In one embodiment, the marketplace server 103 assigns a customer quality score to a customer that is indicative of a life time value of the customer. The marketplace server 103 may access the customer record of a customer from the account database 111 to identify one or more of the following purchase trends comprising the recency of the customer's last purchase (e.g., 2 weeks ago), the frequency in which the customer purchases products through the marketplace server 103 (e.g., monthly orders), and/or an average value of the customer's purchases (e.g., average order of $50). Based on these factors, the marketplace server 103 calculates the customer quality score indicating the life time value of the customer. For example, a high score (e.g., above a threshold) may indicate that an associated customer is more valuable because the customer frequently makes high purchase transactions compared to other customers with a lower score.

The marketplace server 103 may communicate the customer quality score and a customer's purchasing trends to vendors 107. The vendors 107 may dynamically modify product offerings to the customer based on the customer quality score and the purchase trends of the customer. If a customer's score indicates a high value customer, the vendor may modify product offerings specific to the customer. For example, if the vendor 107 determines that the customer is a high value customer and buys multiple products within a month each with a value of $50, the vendor may provide to the customer multiple product offerings each costing $50 rather than a single product at $30. By providing multiple product offerings, the odds of the customer purchasing a product are increased.

SUMMARY

The foregoing description of the embodiments above has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable storage medium containing computer program code, which can be executed by a computer processor for performing any or all of the steps, operations, or processes described.

The embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments described above be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method of a marketplace server for determining post sale affiliate compensation, the method comprising:
    receiving, by a computer, payment information from a first client device of a customer to purchase a product of a vendor;
    identifying, by the computer, a first device fingerprint that identifies the first client device;
    identifying, by the computer, a first device identifier based on the device fingerprint;
    completing, by the computer, the purchase of the product by the first client device;
    accessing, by the computer, a plurality of records that describe customers of the marketplace server to determine whether the payment information is included in the plurality of records;
    responsive to determining that the payment information is included in a first data record associated with a second client device having a second client identifier different than the first client identifier, determining, by the computer, whether the first data record including the payment information is associated with the first device identifier;
    responsive to determining that the first data record includes the payment information but is not associated with a second data record corresponding to the first client device that completed the purchase of the product, associating, by the computer, the second data record with the first data record;
    identifying a plurality of hop records from the first data record associated with the second client device, the hop records describing an exposure of the second client device to affiliate referral links;
    determining, by the computer, from the associated identified hop records, an affiliate that referred the product to the customer; and
    compensating the affiliate for referring to the customer, via the second client device, the product purchased by the customer using the first client device.

2. The computer-implemented method of claim 1, wherein a plurality of records associated with a customer represents a data record tree of the customer, the data record tree comprising:
    a customer record comprising attributes of the customer; and
    one or more device records that are associated with the customer record, a device record describing client devices associated with the customer;
    wherein each device record is associated with one or more hop records describing affiliates that referred the customer to products of vendors and is associated with one or more order records describing purchase transactions of the customer with the marketplace server using a client device associated with the device record.

3. The computer-implemented method of claim 1, further comprising:
    receiving, from the first client device of the customer, a request to purchase the product of the vendor;
    identifying data records associated with the first client device of the customer; and
    determining, from the data records associated with the first client device, whether an affiliate referred the product to the customer; and
    determining, from the data records that an affiliate did not refer the product to the customer.

4. The computer-implemented method of claim 1, wherein determining the affiliate that referred the product comprises:
  determining a first affiliate and a second affiliate that referred the product to the customer; and
  compensating the first affiliate and the second affiliate for referring the product to the customer.

5. The computer-implemented method of claim 4, wherein the compensation distributed to the second affiliate is less than the compensation distributed to the first affiliate.

6. The computer-implemented method of claim 4, wherein the compensation distributed to the second affiliate is greater than the compensation distributed to the first affiliate.

7. The computer-implemented method of claim 4, wherein the compensation distributed to the second affiliate is equal to the compensation distributed to the first affiliate.

8. A computer program product comprising a non-transitory computer-readable storage medium storing computer-executable code for determining post sale affiliate compensation, the code executable to perform steps comprising:
  receiving payment information from a first client device of a customer to purchase a product of a vendor;
  identify a first device fingerprint that identifies the first client device;
  identify a first device identifier based on the device fingerprint;
  completing the purchase of the product by the first client device;
  accessing a plurality of records that describe customers of the marketplace server to determine whether the payment information is included in the plurality of records;
  responsive to determining that the payment information is included in a first data record associated with a second client device having a second client identifier different than the first client identifier, determining whether the first data record including the payment information is associated with the first device identifier;
  responsive to determining that the first data record includes the payment information but is not associated with a second data record corresponding to the first client device that completed the purchase of the product, associating the second data record with the first data record;
  identifying a plurality of hop records from the first data record associated with the second client device, the hop records describing an exposure of the second client device to affiliate referral links;
  determining, from the associated identified hop records, an affiliate that referred the product to the customer; and
  compensating the affiliate for referring to the customer, via the second client device, the product purchased by the customer using the first client device.

9. The computer program product of claim 8, wherein a plurality of records associated with a customer represents a data record tree of the customer, the data record tree comprising:
  a customer record comprising attributes of the customer; and
  one or more device records that are associated with the customer record, a device record describing client devices associated with the customer;
  wherein each device record is associated with one or more hop records describing affiliates that referred the customer to products of vendors and is associated with one or more order records describing purchase transactions of the customer with the marketplace server using a client device associated with the device record.

10. The computer program product of claim 8, the code executable to perform further steps comprising:
  receiving, from the first client device of the customer, a request to purchase the product of the vendor;
  identifying data records associated with the first client device of the customer; and
  determining, from the data records associated with the first client device, whether an affiliate referred the product to the customer; and
  determining, from the data records that an affiliate did not refer the product to the customer.

11. The computer program product of claim 8, wherein determining the affiliate that referred the product comprises:
  determining a first affiliate and a second affiliate that referred the product to the customer; and
  compensating the first affiliate and the second affiliate for referring the product to the customer.

12. The computer program product of claim 11, wherein the compensation distributed to the second affiliate is less than the compensation distributed to the first affiliate.

13. The computer program product of claim 11, wherein the compensation distributed to the second affiliate is greater than the compensation distributed to the first affiliate.

14. The computer program product of claim 11, wherein the compensation distributed to the second affiliate is equal to the compensation distributed to the first affiliate.

15. A computer system for determining post sale affiliate compensation, the system comprising:
  a computer processor; and
  a non-transitory computer-readable storage medium storing executable instructions configured to execute on the computer processor, the instructions when executed by the computer processor are configured to perform steps comprising:
    receiving payment information from a first client device of a customer to purchase a product of a vendor;
    identifying, by the computer, a first device fingerprint that identifies the first client device;
    identifying, by the computer, a first device identifier based on the device fingerprint;
    completing the purchase of the product by the first client device;
    accessing a plurality of records that describe customers of the marketplace server to determine whether the payment information is included in the plurality of records;
    responsive to determining that the payment information is included in a first data record associated with a second client device having a second client identifier different than the first client identifier, determining whether the first data record including the payment information is associated with first the device identifier;
    responsive to determining that the first data record includes the payment information but is not associated with a second data record corresponding to the first client device that completed the purchase of the product, associating the second data record with the first data record;
    identifying a plurality of hop records from the first data record associated with the second client device, the hop records describing an exposure of the second client device to affiliate referral links;

determining, from the associated identified hop records, an affiliate that referred the product to the customer; and compensating the affiliate for referring to the customer, via the second client device, the product purchased by the customer using the first client device.

16. The computer system of claim 15, wherein a plurality of records associated with a customer represent a data record tree of the customer, the data record tree comprising:

a customer record comprising attributes of the customer; and one or more device records that are associated with the customer record, a device record describing client devices associated with the customer;

wherein each device record is associated with one or more hop records describing affiliates that referred the customer to products of vendors and is associated with one or more order records describing purchase transactions of the customer with the marketplace server using a client device associated with the device record.

17. The computer system of claim 15, wherein the instructions when executed by the computer processor are configured to perform further steps comprising:

receiving, from the first client device of the customer, a request to purchase the product of the vendor;

identifying data records associated with the first client device of the customer; and determining, from the data records associated with the first client device, whether an affiliate referred the product to the customer; and determining, from the data records that an affiliate did not refer the product to the customer.

18. The computer system of claim 15, wherein determining the affiliate that referred the product comprises:

determining a first affiliate and a second affiliate that referred the product to the customer; and compensating the first affiliate and the second affiliate for referring the product to the customer.

19. The computer system of claim 18, wherein the compensation distributed to the second affiliate is less than the compensation distributed to the first affiliate.

20. The computer system of claim 18, wherein the compensation distributed to the second affiliate is greater than the compensation distributed to the first affiliate.

21. The computer system of claim 18, wherein the compensation distributed to the second affiliate is equal to the compensation distributed to the first affiliate.

* * * * *